United States Patent [19]

Csordás et al.

[11] Patent Number: 4,632,422
[45] Date of Patent: Dec. 30, 1986

[54] ANTI-ROLL TORSION BAR (STABILIZER) FOR THE RUNNING GEAR OF VEHICLES

[75] Inventors: László Csordás; Gyula Maros; József Németh, all of Budapest; Gyula Rózsa, Körmend; János Urbantsok, Budapest, all of Hungary

[73] Assignees: Autóipari Kutató és Fejlesztö Vállalat; IKARUS Karosszéria és Jármügyár, both of Budapest, Hungary

[21] Appl. No.: 686,515

[22] Filed: Dec. 26, 1984

[30] Foreign Application Priority Data

Dec. 30, 1983 [HU] Hungary ............... 4531/83

[51] Int. Cl.$^4$ .............................. B60G 9/02
[52] U.S. Cl. ................................... 280/689
[58] Field of Search ............... 280/6 H, 689, 665, 702, 280/701

[56] References Cited

U.S. PATENT DOCUMENTS

| 4,168,075 | 9/1979 | Matschinsky | 280/689 |
| 4,168,086 | 9/1979 | Dick | 280/689 |
| 4,218,072 | 8/1980 | Wallis | 280/689 |

*Primary Examiner*—Richard A. Bertsch
*Attorney, Agent, or Firm*—Spencer & Frank

[57] ABSTRACT

The invention relates to an anti-roll torsion bar in a stabilizing arrangement in particular for running gears with rigid axle suspended with coil-plate, and/or pneumatic springs in public road vehicles, having draw bars on both sides of the vehicle, which are pivotally coupled to the chassis and the rigid axle.

In accordance with the invention the draw bars have pivoted distance pieces which are lying outside the pivots connected to the chassis, where in the axis of the pin of the pivot is lying perpendicularly to the plane defined by the geometric axis of the torsion bar and the draw bar, respectively, and the torsion bar is supported in said distance pieces in a non-turnable manner, however so, that it could be displaced at least in one of said distance pieces in direction of the bar.

2 Claims, 2 Drawing Figures

ANTI-ROLL TORSION BAR (STABILIZER) FOR THE RUNNING GEAR OF VEHICLES

BACKGROUND OF THE INVENTION

The invention relates to the arrangement of anti-roll torsion bars for the running gear, in particular for the bridge guided with draw bars and having a rigid axle in motor vehicles for public traffic. The arrangement can be equally used for constructions suspended with coil-, plate-, and/or pneumatic springs.

Continuously increasing motorization involves increased demands in respect to the elements of the motor vehicles, which are of special importance from the point of view of safety. This category includes the suspending elements of the running gears, i.e. the anti-roll torsion bars preventing excessive lateral tilting of the vehicle body.

Running gears with rigid axles of vehicles with a large total mass (autobusses, lorriers etc.) used to be guided by longitudinal and transversal draw bars, while lateral tilting of the vehicle body occurring under the influence of the curved travel of the vehicle is reduced by using anti-roll torsion bars.

Running gear has to be connected to the vehicle body so, that coupling should ensure motion on an approximately vertical path, as required by springing of the running gear, i.e. transmission of force effects between running gear and vehicle body should be guaranteed. Expediently this requirement can be met by using longitudinal and transversal draw bars.

The body of the vehicle travelling on a curved path is tilting to the side around the so-called axle of transversal stability under the influence of the affecting centrifugal force. Excessive lateral tilting of the vehicle body is most detrimental from the point of view of vehicle stability and safety. Therefore, to prevent lateral tilting anti-roll torsion bars are used.

An anti-roll torsion bar assembly used in heavy-category motor vehicles can be characterized in that it has a bar running parallel with the axle of the running gear and further has two arms. Upon lateral tilting of the vehicle body the ends of the arms become displaced and owing to its torsional elasticity the anti-roll torsion bar (stabilizer) is giving a moment onto the vehicle body which tries to tilt back the vehicle body in its basic position.

The two functions (guiding of the axle and stabilizing) can be realized with two independent systems, or by uniting the two systems.

The application of the latter solution is motivated by less space requirement and smaller mass.

However, with solutions resulting from the combination of the two systems, several problems are to be confronted with:

lateral displacement of the vehicle body causes accessory bending load of the draw bars and the torsion bars;

break of the stabilizer involves the "loss" of the running gear.

The anti-roll torsion bar according to the German Patent DE-AS No. 2 161 058 is also subjected to an accessory bending load. The swinging lever of the anti-roll torsion bar being parallel with the longitudinal axis of the vehicle is rigidly clamped at the end of the torsion bar, while the torsion bar is formed as a bar being parallel with the rigid axle.

SUMMARY OF THE INVENTION

The aim of our invention was to develop a stabilizing arrangement which is not subjected to accessory bending loads, it can be easily installed and can be equally used for suspensions with plate-, coil-, and/or pneumatic springs, connected to swinging levers of simple construction. The aim set was achieved according to the invention, in so far as the swinging lever of the anti-roll torsion bar connected pivotally to the rigid axle and the chassis is coupled to the torsion bar so, as to be able to rotate in the plane including the centreline of said bar. On the end of the torsion bar a head is pivotally fixed in an axially displaceable manner and the pivot has a pin, the axis of which is perpendicular to the plane including the axis of the torsion bar and the axis of the swinging lever of the anti-roll torsion bar.

Accordingly, our invention relates to the arrangement of the anti-roll torsion bar for the running gears of public road vehicles, having a rigid axle and suspended by coil-, plate-, and/or pneumatic spring, wherein the rigid axle is connected to the chassis and the axle on both sides of the vehicle by draw bars supported in ball-joints, furtheron there is a torsion bar arranged parallel with the axle and said torsion bar arranged parallel with the axle and said torsion bar is coupled in a non-turnable manner to a pivoted distance piece each lying outside the connection point of the draw bars and the axis of the pin of pivot thereof is perpendicular to the plane defined by the torsion bar and the single draw bars, however so, that it could be displaced in at least one of the distance pieces in direction of the bar.

A most advantageous feature of the invention lies in that it is well suitable for reconstructing running gears without anti-roll torsion bars into ones provided with it, supposed that sufficient space stays at disposal, without the necessity to change points of suspension or it can be applied most economically for product-families with or without anti-roll torsion bars, only with draw bars, without torsion bars and pivotally connected distance pieces.

The invention will be described in detail by means of a preferred embodiment by the aid of FIGS. 1 and 2, wherein:

DESCRIPTION OF THE PREFERRED EMBODIMENT

Figure 1:
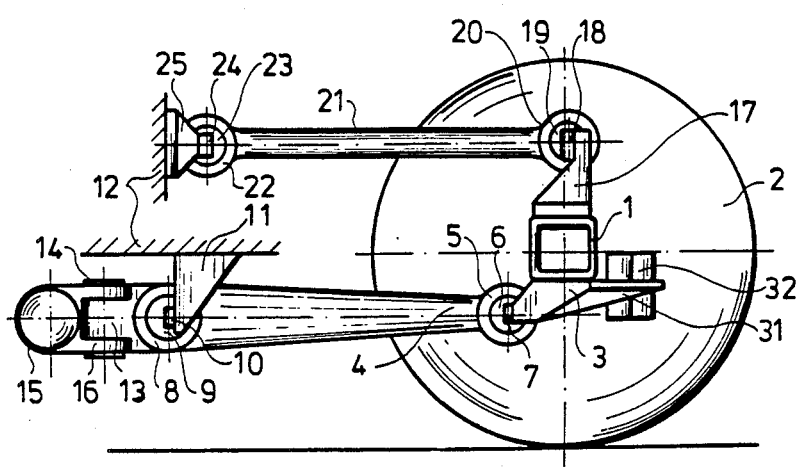
FIG. 1 is a side elevational view of the anti-roll torsion bar according to a preferred embodiment of the invention.
Figure 2:
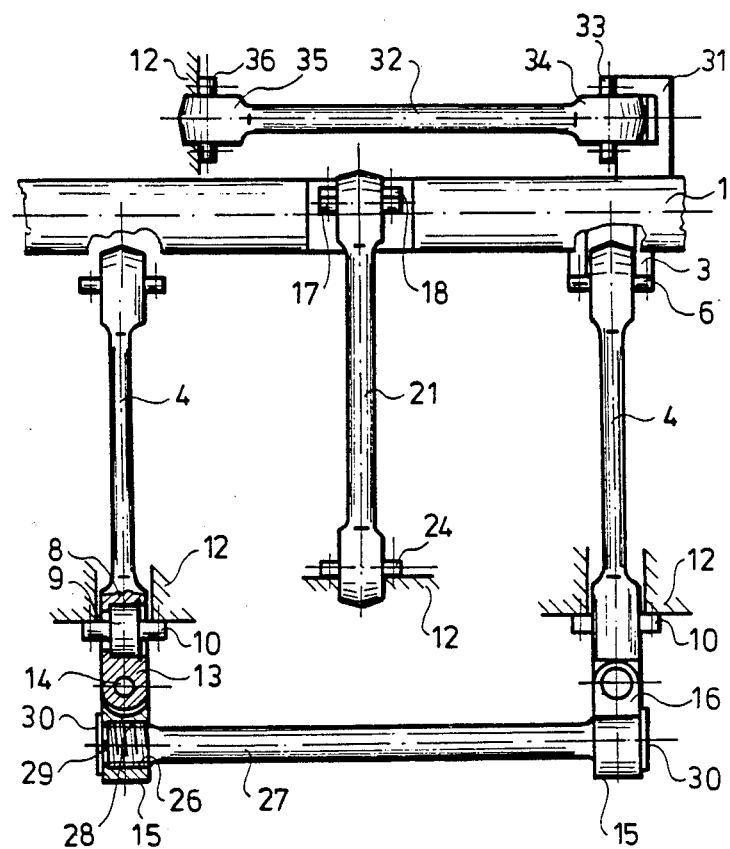
FIG. 2 is a top plan view of the same embodiment.

On the axle 1—carried by the wheels 2—consoles are arranged on the pins 7 of the resilient pivots 6 in the bar-heads 5 of the draw bars 4. The resilient pivot 6 allows the elastic rotation around its pin 7, to a slight extent it is elastic in other directions too. The draw bar 4 lies perpendicularly—or nearly perpendicularly—to the axle 1 and it is connected to the console 11 of the chassis 12 through the pin 10 of the resilient pivot 9 having been arranged in the bar-lug 8. Said bar-lug is lying next to the pivot head 13 of the draw bar 4. The pivot head 13 has the pin 14 which runs perpendicular to the plane including the axes of the draw bar 4; the pin 14 is connected to the forked bar-head distance piece 15, the fork 16 of the pivoted distance piece. Into the splined bore 26 of the forked bar-head 15 the finned bar-end 28 of the torsion bar 27 is fitted in an axially displaceable manner. In standstill the centreline of the torsion bar 27 runs parallel with the centreline of the axle 1. On the bar-end 28 of the torsion bar the buffer cam 29 is to be found, the counter buffer of which is formed by the closing lid 30 of the forked bar-head 15. The torsion bar 27 is able to move in the splinned bores 26 of the bar heads 15 axially, however, restricted by the closing lids 30.

The axle 1 is led along the draw bars 4—i.e. coupled to the chassis 12—by the longitudinal and transversal swinging levers 21 and 32, respectively. The pin 18 engages with the console 17 fixed on the axle 1, which is simultaneously the pin of the elastic pivot 19 in the bar-lug 20 of the longitudinal swinging lever 21. The pin 24 of the elastic pivot 23 arranged in the bar-lug 22 on the other end of the longitudinal swinging lever 21 is connected to the trestle having been fixed on the chassis 12. To the console 31 fixed on the axle 1 the pin 33 is connected which is the pin of the resilient pivot lying in the bar-lug 34 of the transversal swinging lever. The pin 36 of the resilient pivot arranged in the bar-lug 35 on the other end of the transversal swinging lever 32 is connected to the chassis 12.

In course of the travel of the motor vehicle the torsion bar 27 exerts its stabilizing effect, if the distance between the wheels 2 on the rigid axle 1 of the running gear and the chassis 12 is not the same, i.e. they are differently springing. Now the centreline of the axle 1 and the centreline of the torsion bar are not coplanar anymore, centrelines of the draw bars do not run parallel and there is a larger distance between the pins 14. This becomes possible by the axial displacement of the torsion bar 27 in the forked barhead 15, while the latter is simultaneously running around the pin 14. By said movement it can be achieved that the torsion bar 27 is loaded exclusively by torque and it is not subjected to bending load. Prevailing position of the axle 1 in course of springing will be always commonly defined by the draw bars 4, the longitudinal swinging lever 21 and the transversal lever 32.

We claim:

1. In a vehicle including a chassis, an axle having a longitudinal axis, resilient suspension means mounting said axle on said chassis for providing for a springing vertical displacement of said axle relative to said chassis, and an anti-roll torsion bar assembly including two spaced draw bars each having a longitudinal axis, first pivot means for individually pivotally securing each said draw bar to said axle, second pivot means for individually pivotally securing each said draw bar to said chassis, said first and second pivot means being arranged for allowing a swinging motion of each said draw bar in a plane perpendicular to said longitudinal axis of said axle; said anti-roll torsion bar assembly further including a torsion bar arranged spaced from and parallel to said axle and having a longitudinal axis, and coupling means for connecting said torsion bar to said draw bars; the improvement wherein said coupling means comprises means for transmitting from said draw bars to said torsion bar substantially solely a torque in response to displacements of the draw bars relative to one another about said first and second pivot means.

2. In a vehicle including a chassis, an axle having a longitudinal axis, resilient suspension means mounting said axle on said chassis for providing for a springing vertical displacement of said axle relative to said chassis, and an anti-roll torsion bar assembly including two spaced draw bars each having a longitudinal axis, first pivot means for individually pivotally securing each said draw bar to said axle, second pivot means for individually securing each said draw bar to said chassis, said first and second pivot means being arranged for allowing a swinging motion of each said draw bar in a plane perpendicular to said longitudinal axis of said axle; said anti-roll torsion bar assembly further including a torsion bar arranged spaced from and parallel to said axle and having a longitudinal axis, and coupling means for connecting said torsion bar to said draw bars; the improvement wherein said coupling means comprises
  (a) a separate distance piece associated with each said draw bar at a location externally of a zone between said first and second pivot means;
  (b) third pivot means for pivotally attaching each said distance piece to a respective said draw bar; said third pivot means having a pivotal axis oriented perpendicularly to a plane generally defined by said longitudinal axes of said draw bars and said torsion bar; and
  (c) torsion bar receiving means formed in the separate distance pieces for securing said torsion bar, at spaced locations thereof, to said distance pieces; said torsion bar receiving means including
    (1) means for holding said torsion bar non-rotatably relative to each said distance piece; and
    (2) means for holding said torsion bar longitudinally displaceable relative to at least one of said distance pieces.

* * * * *